United States Patent
Hsiao et al.

(10) Patent No.: US 9,733,688 B2
(45) Date of Patent: Aug. 15, 2017

(54) VIRTUAL BATTERY MANAGEMENT IN ELECTRONIC DEVICE

(71) Applicant: MediaTek Inc., Hsin-Chu (TW)

(72) Inventors: Chih-Hsiang Hsiao, Taipei (TW); Yu-Cheng Hsieh, Hsinchu (TW); Yun-Ching Li, Bade (TW); Jih-Ming Hsu, Zhongli (TW)

(73) Assignee: MEDIATEK INC., Hsin-Chu (TW)

( * ) Notice: Subject to any disclaimer, the term of this patent is extended or adjusted under 35 U.S.C. 154(b) by 413 days.

(21) Appl. No.: 14/478,116

(22) Filed: Sep. 5, 2014

(65) Prior Publication Data

US 2016/0070326 A1 Mar. 10, 2016

(51) Int. Cl.
*G06F 1/26* (2006.01)
*G06F 1/32* (2006.01)
*G06F 1/16* (2006.01)

(52) U.S. Cl.
CPC .......... *G06F 1/3203* (2013.01); *G06F 1/1626* (2013.01); *G06F 1/3212* (2013.01); *G06F 1/3287* (2013.01)

(58) Field of Classification Search
None
See application file for complete search history.

(56) References Cited

U.S. PATENT DOCUMENTS

| | | | |
|---|---|---|---|
| 5,881,299 A | 3/1999 | Nomura et al. | |
| 2007/0243852 A1* | 10/2007 | Gibbs | H04W 52/0264 455/343.5 |
| 2007/0268200 A1 | 11/2007 | Fuller et al. | |
| 2008/0235527 A1 | 9/2008 | Heller et al. | |
| 2010/0023940 A1* | 1/2010 | Iwamatsu | G06F 1/3203 718/1 |

FOREIGN PATENT DOCUMENTS

| | | |
|---|---|---|
| WO | WO 98/21709 | 5/1998 |
| WO | WO 01/39167 | 5/2001 |
| WO | WO 2007/114960 | 10/2007 |

* cited by examiner

*Primary Examiner* — Nitin Patel
(74) *Attorney, Agent, or Firm* — McClure, Qualey & Rodack, LLP (57) ABSTRACT

An electronic device and associated method is provided. The electronic device includes: a plurality of subsystems including hardware resources; a battery coupled to the plurality of subsystems; and a processing unit, configured to allocate a virtual battery from the battery for each subsystem, wherein each virtual battery has a defined power budget from the battery.

15 Claims, 10 Drawing Sheets

| Per day usage | Mobile link (BT connecting) | Sensor (pedometer) | Incoming notification | Clock update | App use |
|---|---|---|---|---|---|
| Light user | always-on | 1 hour | 15 times | 1 sec | 10 min |
| Heavy user | always-on | always-on | 15 times | 1 sec | 1 hour |
| Watch only | × | × | × | 1 sec | × |
| Always-on app | always-on | always-on | 15 times | 1 sec | × |

VIRTUAL BATTERY MANAGEMENT IN ELECTRONIC DEVICE

BACKGROUND OF THE INVENTION

Field of the Invention

The invention relates to an electronic device and associated method, and, in particular, to an electronic device with managed virtual batteries and associated method.

Description of the Related Art

Increasing use of portable computing or electronic devices has led to increased reliance on battery power. Devices such as cell phones, personal digital assistants (PDAs), smartphones, tablet PCs, e-mail devices, audio players, video players, etc., are complex devices often having many functions and subsystems. Typically, one battery is used to provide all of the device's power needs.

Some devices, such as portable electronic devices, allow power-management. Thus, it is possible to designate when a portable computer will go into a low-power mode after an interval of non-use. Low power modes can include standby, hibernate, and the like. Other ways to manage power can include controlling subsystems such as the display screen, memory units, etc., and placing these subsystems in higher or lower power modes according to determinations made by hardware or software running in the device, or according to determinations made by a user of the device. However, because battery power is so important to a portable electronic device, it is desirable to provide more control and flexibility over the battery power.

BRIEF SUMMARY OF THE INVENTION

A detailed description is given in the following embodiments with reference to the accompanying drawings.

An electronic device is provided. The electronic device includes: a plurality of subsystems including hardware resources; a battery coupled to the plurality of subsystem; and a processing unit, configured to allocate a virtual battery from the battery for each subsystem, wherein each virtual battery has a defined power budget from the battery.

A method for allocating power on an electronic device is further provided. The electronic device comprises a processing unit, a plurality of subsystems including hardware resources, and a battery. The method comprises the steps of: monitoring power usage of each subsystem by the processing unit; and allocating a virtual battery from the battery for each subsystem by the processing unit, wherein each virtual battery has a defined power budget from the battery.

A method for allocating power on an electronic device is provided. The electronic device comprises a processing unit, and a battery. The method comprises the steps of: executing a plurality of applications by the processing unit; and allocating a virtual battery from the battery for each application by the processing unit, wherein each virtual battery has a defined power budget from the battery and the virtual battery of each subsystem is independent from each other.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
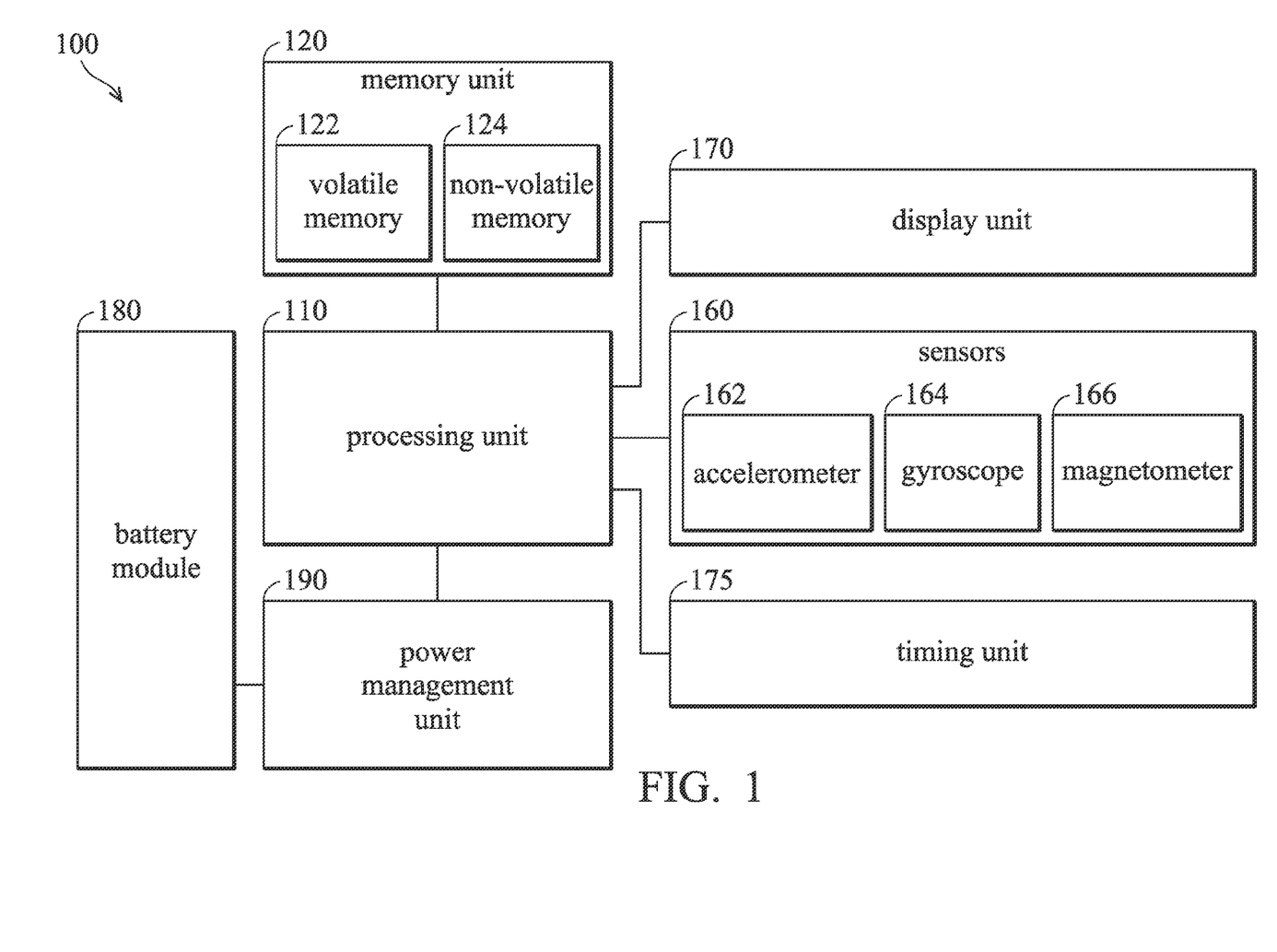
FIG. 1 is a block diagram illustrating an electronic device in accordance with an embodiment of the invention.

FIG. 1 is a block diagram illustrating an electronic device in accordance with an embodiment of the invention. The electronic device 100 comprises a processing unit 110, a memory unit 120, sensors 160, a display unit 170, a timing unit 175, a battery module 180, and a power management unit 190. In an embodiment, the processing unit 110 may include one or more processors (and/or microcontrollers (MCU)) communicating between the power management unit 190, the memory unit 120, and subsystems of the electronic device 100. The memory unit 120 may include a volatile memory (e.g. SRAM) 122 and a nonvolatile memory 124. The memory unit 120 may be utilized as the main memory for the processing unit 110 for executing software routines and other selective storage functions. The non-volatile memory 124 is capable of holding instructions and data without power and may store the software routines and applications for controlling the electronic device 100 in the form of computer-readable program instructions. The non-volatile memory 124 may also contain a user interface program, which provides functionality for the electronic device 100 and can output the graphical user interface on the display unit 170, which may be a touch screen.

The sensors 160 may include an accelerometer 162, a gyroscope 164, and a magnetometer 166, which are coupled to the processing unit 110 via a peripheral interface (not shown). The pedometer subsystem of the electronic device 100 can be implemented by using the sensors 160.

In one embodiment, the display unit 170 may be a touch screen. The display unit 170 may detect contact and any movement or break thereof using any of a plurality of touch-sensitive technologies now known or later developed, including but not limited to capacitive, resistive, infrared, and surface acoustic wave technologies, as well as other proximity sensor arrays or other elements for determining one or more points of contact with the display unit 170. Persons skilled in the art will appreciate that the implementations of the aforementioned peripheral interfaces are well-known, and thus the details will be omitted here.

The timing unit 175 may be utilized as an internal timing device for the electronic device 100. The timing unit 175 may keep track of the time of day and make this data available to the software routines executed by the processing unit 110. For example, a watch subsystem of the electronic device 100 may retrieve the time information from the timing unit 175, so that the time and date can be displayed on the display unit 170.

The battery module 180 powers the various components of the electronic device 100. For example, the battery module 180 includes one or more batteries, such as lithium polymer (Li-Poly), lithium ion (Li-Ion), nickel metal hydride (NiMH) or nickel cadmium (NiCad) batteries. Alternatively, the battery module 180 includes one or more disposable batteries, such as a zinc-carbon battery. The batteries in the battery module 180 have the capacity to store electric charges for powering the electronic device 100, as opposed to a virtual battery which is a logical construct configured on the electronic device 100 as outlined herein. Although the battery module 180 is described primarily with respect to batteries, it can include any other suitable type of energy-providing mechanism, such as capacitors and/or any suitable combination of capacitors and batteries.

In this embodiment, a virtual battery is a logical construct on the electronic device that powers a defined set of applications and has a defined power budget from one or more physical batteries on the electronic device 100. The processing unit 110 executes virtual battery management software which is pre-stored in the non-volatile memory 124 and is configured to maintain power budget information for subsystems of the electronic device 100. For example, the virtual battery management software may monitor the power usage of each subsystem of the electronic device 100, and allocate a power budget for the virtual battery of each subsystem.

The power management unit 190 is configured to control power usage of the subsystems based on the remaining power level of the virtual battery of each subsystem from the virtual battery management software.

The electronic device 100 may be a portable device such as a smartphone or a tablet PC. Alternatively, the electronic device 100 may be a wearable device such as a smart watch or a smart wristband, and the electronic device 100 may further include a strap, a wristband, or a bracelet (not shown in FIG. 1). Alternatively, the electronic device 100 may be a pair of smart glasses, and the electronic device 100 may further include a spectacle frame and optical lenses (not shown in FIG. 1). Alternatively, the electronic device 100 may be an eyewear with a head-up display (HUD). It should be noted that the electronic device 100 may be various forms of wearable accessory, and the invention is not limited to the aforementioned wearable devices. For example, the electronic device 100 can be wearable on a user's wrist, upper arm, and/or leg, or may be attached to the user's clothing, and may have the functions of a wristwatch, a wearable display, a portable media player, and/or a mobile phone in some embodiments.

Figure 2A:
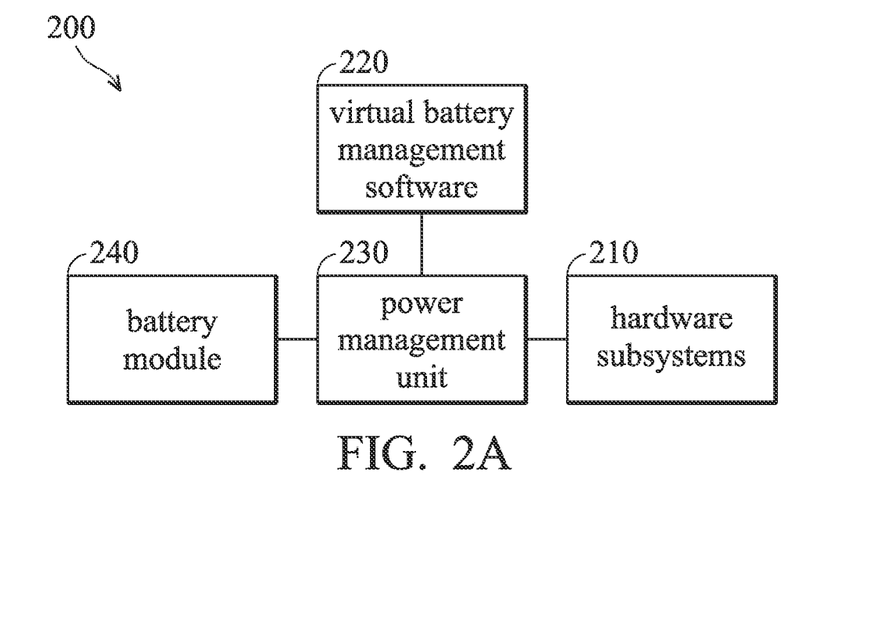
FIG. 2A is a diagram of a virtual battery partitioning structure in accordance with an embodiment of the invention.
Figure 2B:
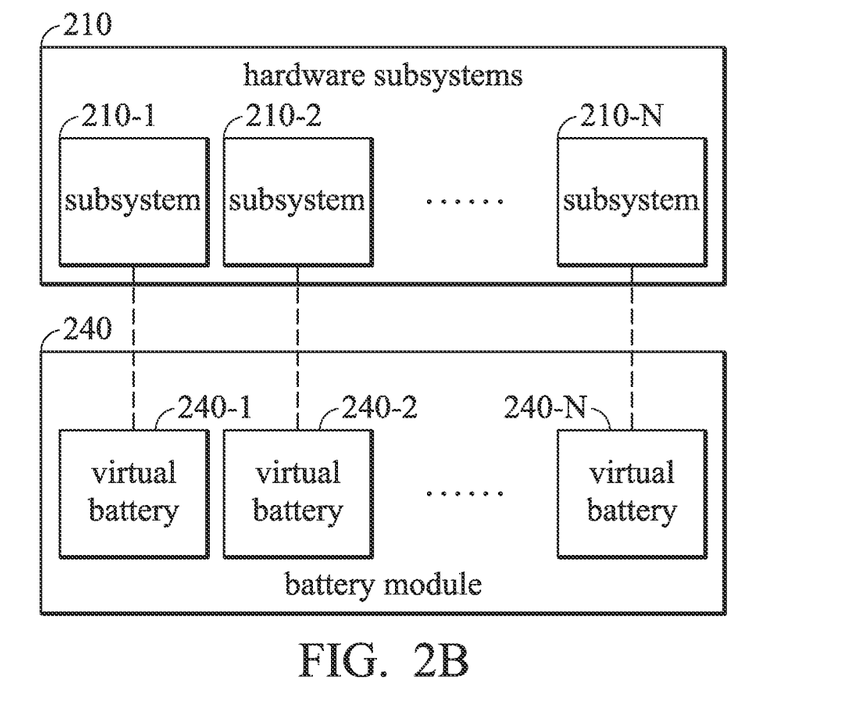
FIG. 2B is a diagram of virtual battery arrangement and mapping to subsystems in accordance with an embodiment of the invention.

FIG. 2A is a diagram of a virtual battery partitioning structure in accordance with an embodiment of the invention. FIG. 2B is a diagram of virtual battery arrangement and mapping to subsystems in accordance with an embodiment of the invention. The virtual battery partitioning structure 200 may include hardware subsystems 210, virtual battery management software 220, a power management unit 230, and the battery module 240. The hardware subsystems 210 may include subsystems 210-1, 210-2, . . . through 210-N. The virtual battery management software 220 is configured to define the power-budget allocation of each subsystem, and the power management unit 230 may manage power control of each subsystem based on the allocated power budget defined by the virtual battery management software 220. For example, the virtual battery management software 220 may retrieve the power consumption information from the power management unit 230 and the hardware subsystems 210. Afterwards, the virtual battery management software 220 may estimate the remaining battery level of each virtual battery and the physical battery based on the power consumption information, and send the estimated remaining battery level of each virtual battery to the power management unit 230, so that the power management unit 230 may update the information of the allocated power budget of each subsystem.

Referring to FIG. 2B, the hardware subsystems 210 may comprise an application subsystem, a connection subsystem, a watch subsystem, a standby subsystem, a communication subsystem, and/or a data link subsystem, etc. It should be noted that the invention is not limited to the aforementioned types of subsystems, the classification of subsystems can be determined according to practical situations. The virtual battery management software 220 may determine the number of predefined subsystems, and then create partitions of virtual batteries of the subsystems. For example, the physical battery in the battery module 240 can be arranged as virtual batteries 240-1, 240-2, . . . through 240-N. The virtual battery 240-1 may map to the subsystem 210-1, and the virtual battery 240-2 may map to the subsystem 210-2, and so on through the virtual battery 240-N mapping to the subsystem 210-N.

In an embodiment, the classifications of the subsystems may be defined by application usage and/or hardware usage. Alternatively, applications or software processes executed by the processing unit 110 may span different subsystems. Specifically, the configuration of the subsystems and the capacity of the virtual batteries can be preset based on the usage of the electronic device 100 and/or the type of the electronic device 100. For example, when the electronic device 100 is a wearable device such as a smart watch, the watch subsystem and the pedometer subsystem, which are mainly focused by the user. Accordingly, the virtual battery management software may allocate greater power budget (i.e. higher capacity of the virtual battery) for the watch subsystem and the pedometer system, thereby guaranteeing a longer use time of the watch subsystem and the pedometer subsystem.

Each subsystem has individual virtual battery (i.e. power budget) and different daily of use (DoU). The virtual battery of each subsystem is independent from each other, and each subsystem acts as if it has its own battery. Although the subsystems share the same battery in the battery module 180, the virtual battery management software may allocate an individual virtual battery for each of the subsystems. Specifically, the virtual battery management software may allocate different power budget for each subsystem and estimate the remaining battery capacity in each virtual battery based on the feedback information from the power management unit 190 and the subsystems.

Generally, the power budget of the application subsystem is much greater than that of other subsystems since the power consumption of the application subsystem is extremely huge when compared with other subsystems. However, the sustainability of the connection subsystem and the watch subsystem is more important for a user in some situations. For example, given that the electronic device 100 is a wearable device, a user may want to keep the watch/clock function or the pedometer function alive as long as possible even when the virtual battery of the application subsystem is exhausted. Alternatively, the electronic device 100 should be ready whenever the user wants to make a phone call or receive emails or messages. That is, the connection subsystem should be alive as long as possible in this case.

Figure 3:
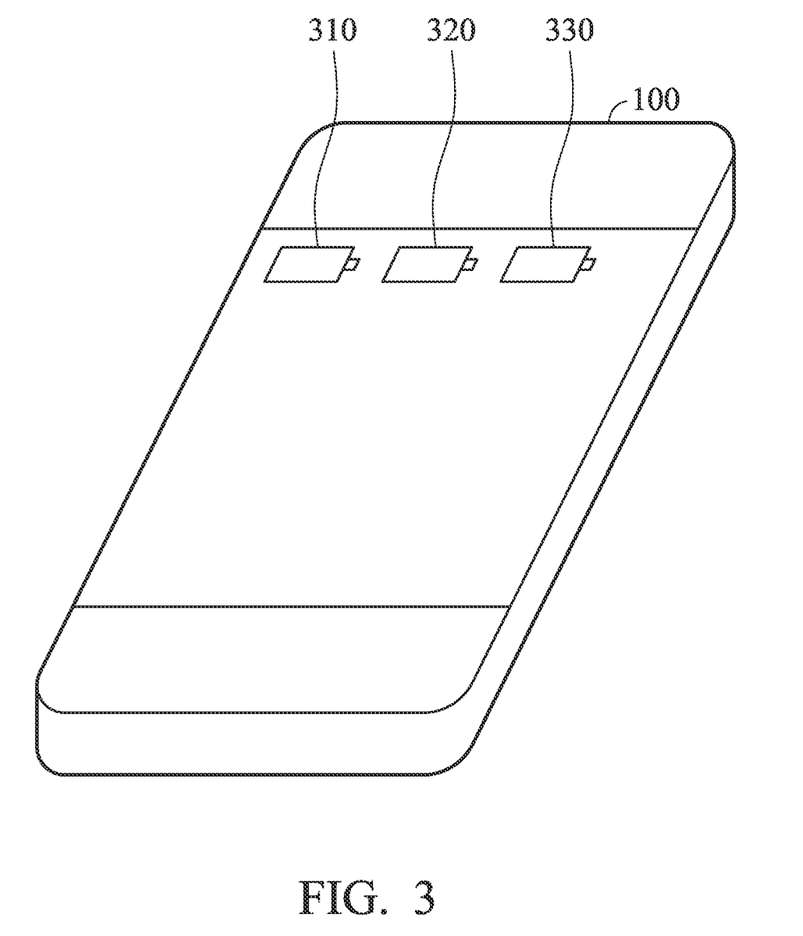
FIG. 3 is a diagram illustrating the virtual battery icons of the subsystems of the electronic device in accordance with an embodiment of the invention.

FIG. 3 is a diagram of a user interface illustrating the virtual battery icons of the subsystems of the electronic device in accordance with an embodiment of the invention. Three virtual battery icons 310, 320 and 330 are displayed on the user interface, and the virtual battery icons 310, 320 and 330 are associated with the application subsystem, the connection subsystem, and the watch subsystem, respectively. In the first scenario, when the virtual battery of the application subsystem is exhausted, the application subsystem will be turned off accordingly. For example, when the user heavily utilizes the electronic device 100 to play games (i.e. on the application subsystem), the virtual battery of the application subsystem may be exhausted quickly. When the remaining battery level of the virtual battery of the application subsystem is less than a predetermined threshold (e.g. 30%), the usage of the application subsystem may be limited as if the overall physical battery of the electronic device 100 nearly runs out. For example, the brightness of the screen displayed by the application subsystem may be lowered and the electronic device 100 may enter a standby mode after a shorter idle period. Furthermore, when the battery level of the virtual battery of the application subsystem is exhausted, the application subsystem is turned off. It should be noted that other subsystems will not be affected by the application subsystem because each subsystem has its own independent virtual battery.

In the second scenario, the power budget of each virtual battery can be adjusted manually by the user. For example, given that the battery level of the virtual battery associated with the connection system nearly runs out and the battery level of the virtual battery associated with the application subsystem still remains high, the user may tap on the virtual battery icon 310 associated with the application subsystem and slide the power bar on the virtual battery icon 310 to manually adjust the power budget of the virtual battery. Since the power of the physical battery in the electronic device 100 may be distributed to each virtual battery with a predetermined ratio (e.g. the virtual batteries of the application subsystem, connection subsystem, and the watch subsystem may have 80%, 10% and 10% power budget of the physical battery, respectively), and the virtual battery having a higher power level can be used to virtually "charge" other virtual batteries having a lower power level. Accordingly, when the user manually adjusts the power bar on the virtual battery icon associated with the application subsystem to a lower power level, the reduced electric charge on the virtual battery associated with the application subsystem can be reallocated and distributed to other virtual batteries by the virtual battery management software and the power management unit 190, and thus the operating time of other subsystems can be extended.

Figure 4A:
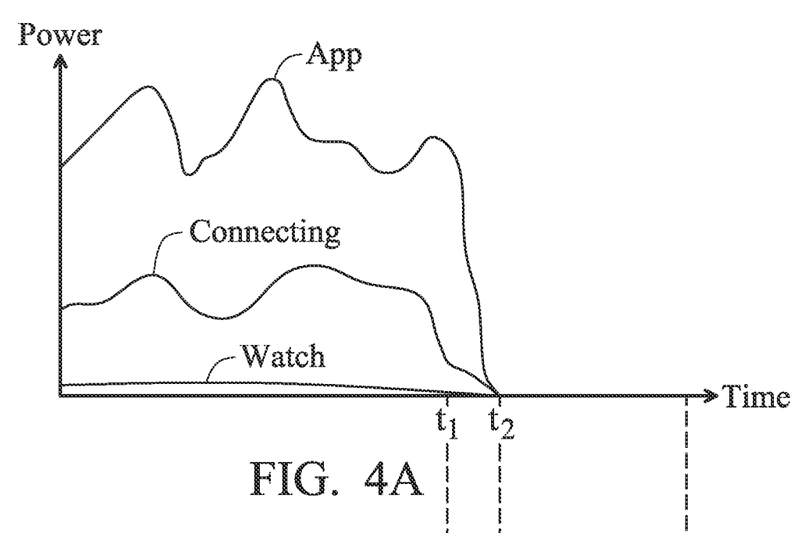
FIG. 4A is a diagram illustrating conventional power usage of different subsystems.
Figure 4B:
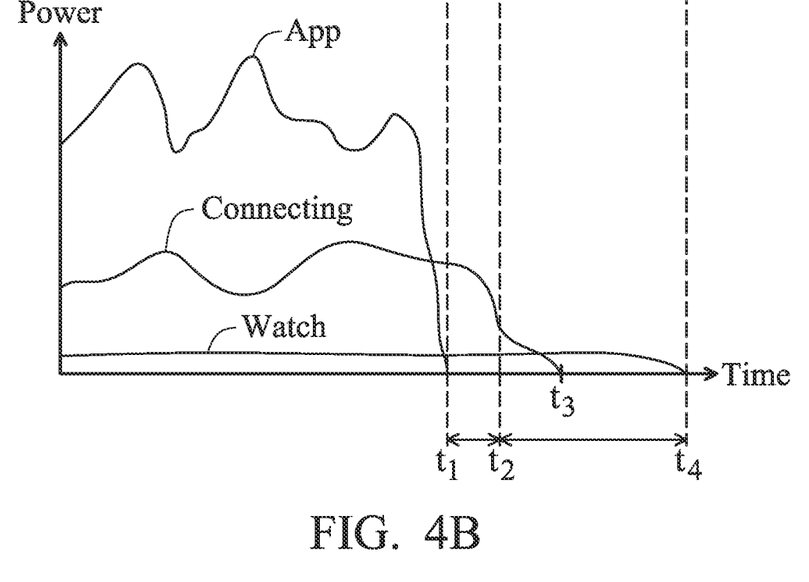
FIG. 4B is a diagram illustrating power usage of different subsystems in accordance with an embodiment of the invention.

FIG. 4A is a diagram illustrating conventional power usage of different subsystems. FIG. 4B is a diagram illustrating power usage of different subsystems in accordance with an embodiment of the invention. FIG. 4A shows that all subsystems may share the same physical battery of a conventional electronic device. Once the physical battery of the conventional electronic device is exhausted, all subsystems will be turned off at the same time (e.g. time t2). Referring to FIG. 4B, by setting a virtual battery for each subsystem, the use time of the power-consuming application subsystem can be slightly decreased (e.g. time t2–t1), but the use time of the connection subsystem and the watch subsystem, which may be more important to the user, can be extended to time t3 and t4, respectively.

Figure 5A:
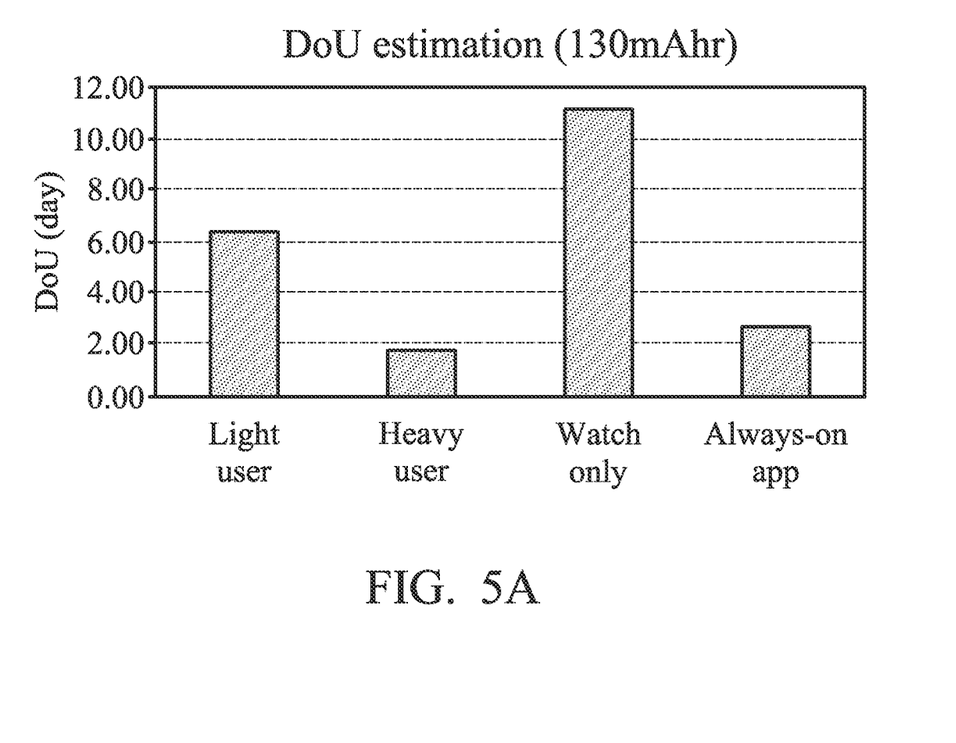
FIG. 5A is a diagram illustrating the estimated use time of different applications and subsystems in various scenarios in accordance with an embodiment of the invention.
Figure 5B:
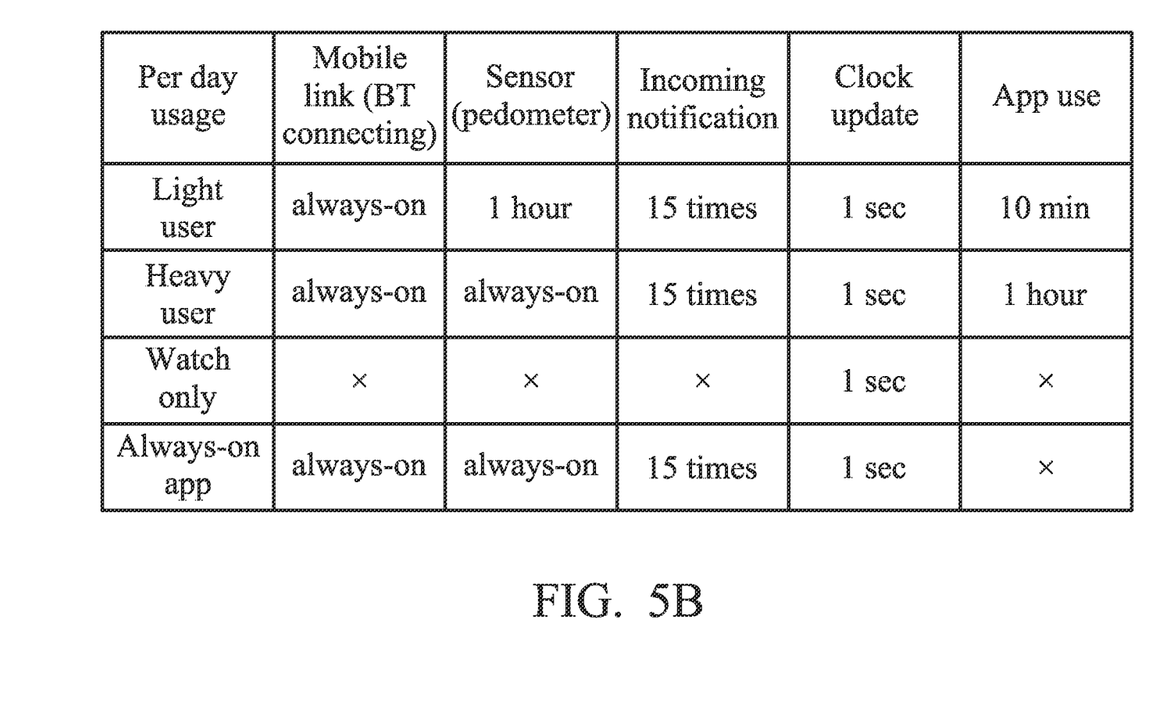
FIG. 5B is a diagram illustrating the usage of different applications and subsystems in various scenarios in a day in accordance with an embodiment of the invention.

FIG. 5A is a diagram illustrating the estimated use time of different applications and subsystems in various scenarios in accordance with an embodiment of the invention. FIG. 5B is a diagram illustrating the usage of different applications and subsystems in various scenarios in a day in accordance with an embodiment of the invention. Referring to both FIG. 5A and FIG. 5B, given that the electronic device 100 is a wearable device, the battery capacity of the electronic device 100 is limited. When the user is a "light user", the user may use the application subsystem for 10 minutes a day, and the sensors (such as the pedometer) are used for 1 hour in a day. It indicates that the user uses the electronic device 100 less often and the electronic device 100 may be on standby for a longer time (e.g. more than 6 days). When the user is a "heavy user", the user may use the application subsystem for an hour a day, and the sensors (such as the pedometer) are always turned on during the day. It indicates that the user may use the application subsystem of the electronic device more often, and power consumption of the electronic device for the heavy user is extremely large, and thus the use time for the heavy user may be much shorter (e.g. less than 2 days). If only the watch subsystem is running on the electronic device, the electronic device 100 may be on standby for a much longer time (e.g. more than 10 days). If only the always-on applications are executed on the electronic device 100, the use time of the electronic device 100 may be slightly longer than that for a heavy user (e.g. more than 2 days).

In another embodiment, the electronic device 100 is a smartphone and there are three subsystems in the electronic device 100, such as a standby subsystem, a communication subsystem, and a data-link subsystem. The user wants to use the smartphone for a 3-day standby time for communication (i.e. making calls). Assuming that the user has already talked for several hours with a few data links and the smartphone has been on standby for 2 days, the power level of the battery of the smartphone is less than 20%. In order to achieve the goal of a 3-day standby time, it is not necessary to disable the data-link subsystem all the time from now on in the invention. Specifically, if the user starts to use the data-link subsystem frequently, the data-link subsystem will be disabled for 2 hours and thus the power of the battery can be saved, so that the goal of a 3-day standby time for communication can be achieved. However, in a conventional smartphone, the data-link subsystem will be disabled from now on in the aforementioned case. Although the standby time may last longer in the conventional smartphone, it may cause inconvenience for the user since the data-link subsystem is disabled and complex manual operations are required.

In another scenario, only a 20% power level of the battery of the electronic device 100 is left, and there is only 10 minutes to charge the electronic device 100. Assume that the power level of the battery of the electronic device 100 can be charged to 70% from 20% in 10 minutes. There are two schemes disclosed in the invention to charge the virtual batteries of the subsystems. For example, in the first scheme, each subsystem has the same priority during charging, and each virtual battery is charged in proportion to the predetermined power budget ratio during the charging of the electronic device 100. In the second scheme, each subsystem may have a different priority during charging, and some of the subsystems with higher priorities can be charged first. For example, given that the electronic device 100 is a wearable device, the watch subsystem and the pedometer subsystem may be more important than other subsystems. In this case, the watch subsystem and the pedometer subsystem can be charged first, so that the watch subsystem and pedometer subsystem can operate for a longer time.

Figure 5C:
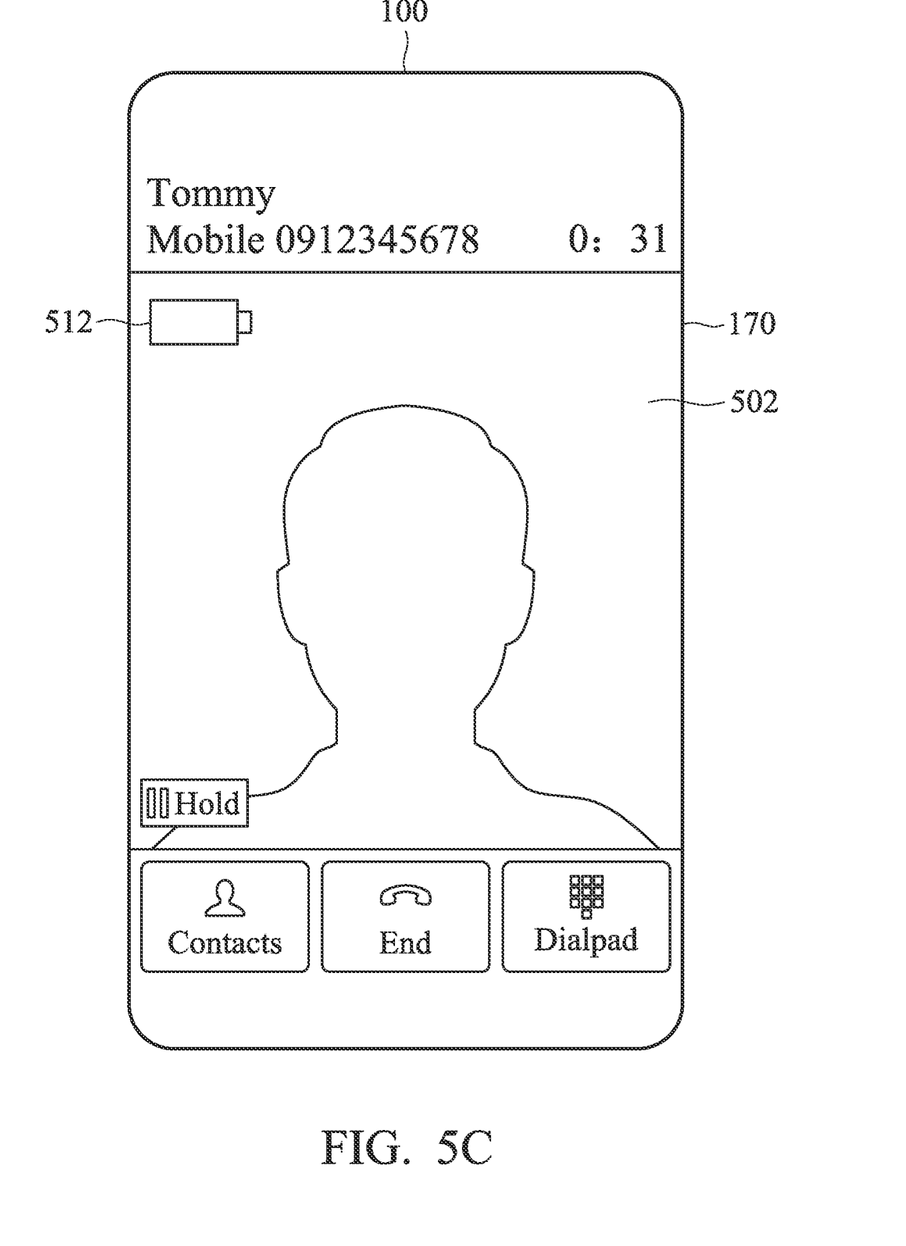
FIGS. 5C-5E are diagrams illustrating different virtual battery icons for different applications in accordance with an embodiment of the invention.
Figure 5D:
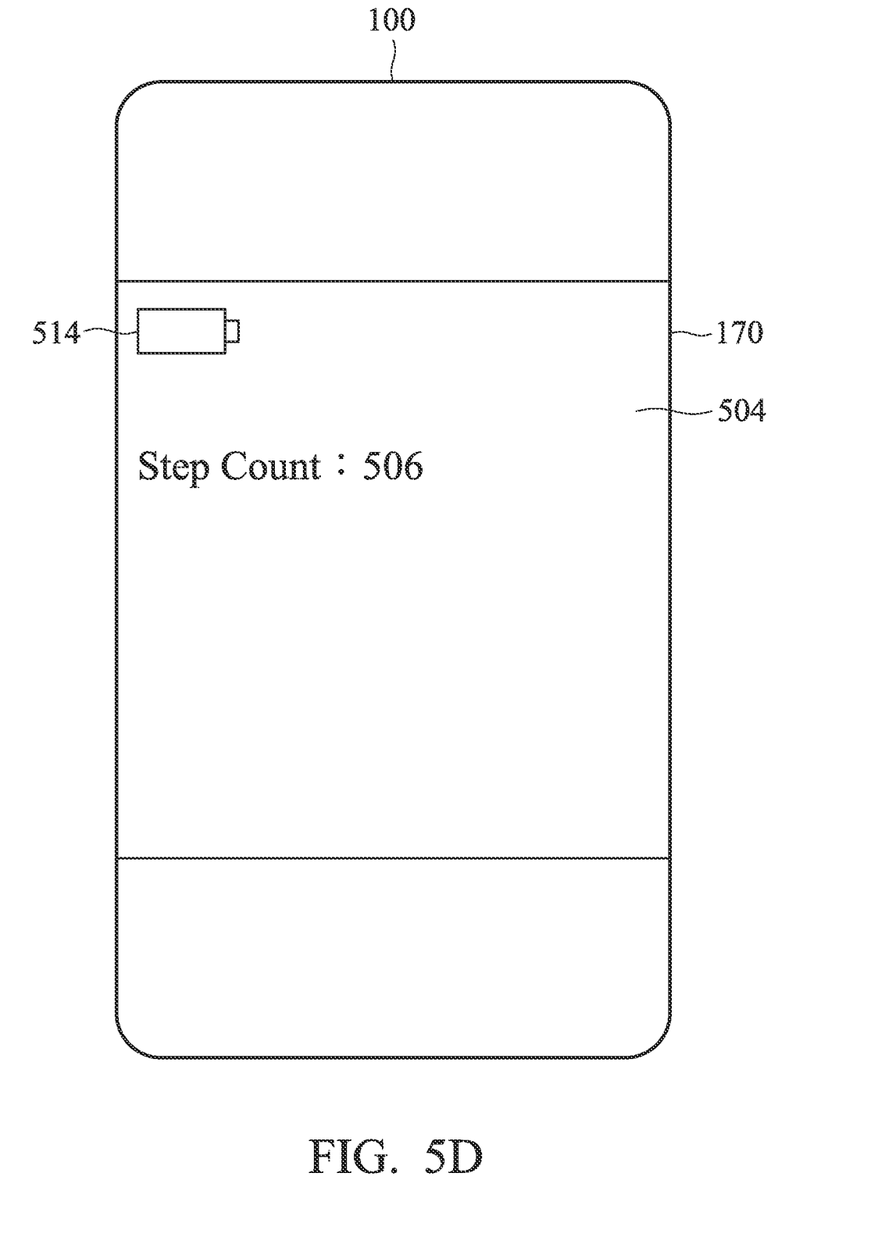
Figure 5E:
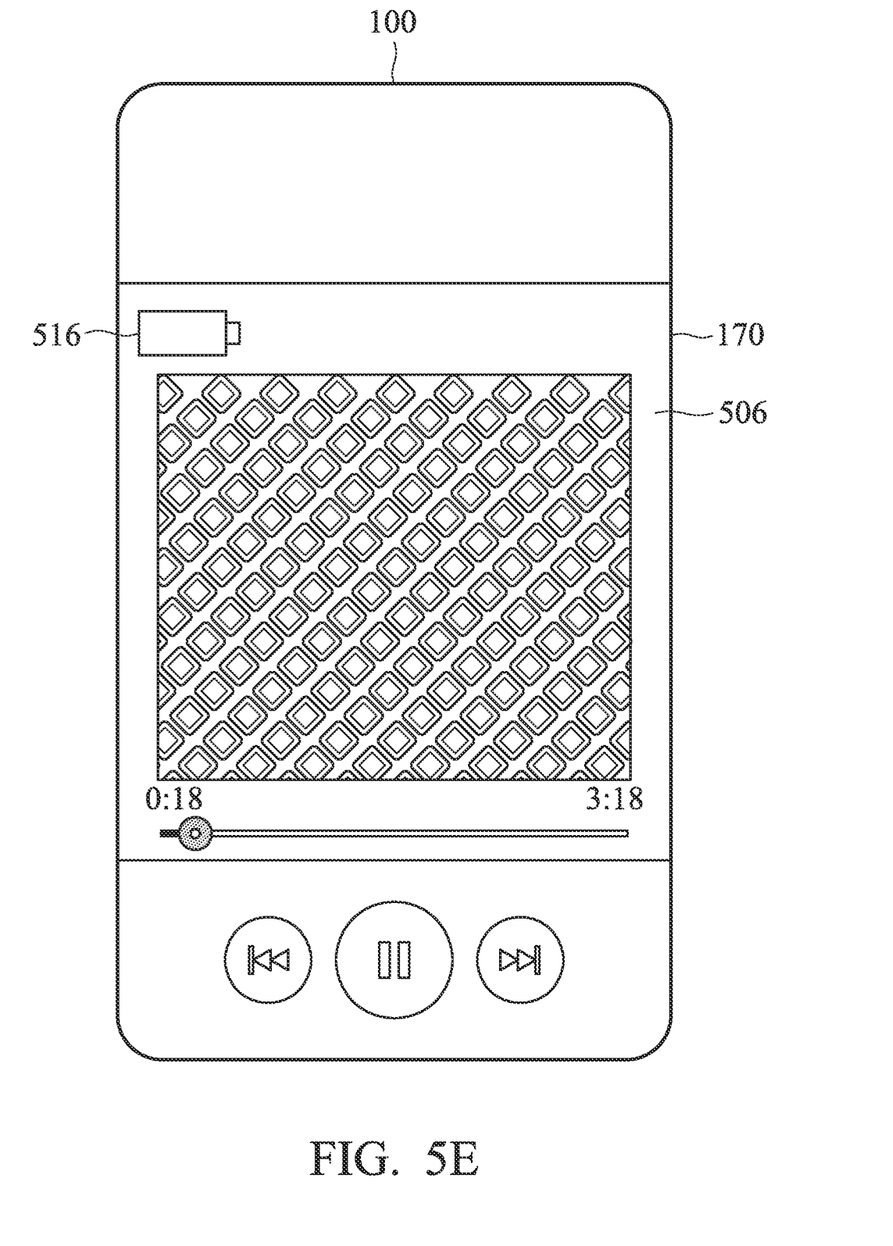

FIGS. 5C~5E are diagrams illustrating different virtual battery icons for different applications in accordance with an embodiment of the invention. The processing unit 110 may allocate a virtual battery with individual budget for each application, such as a telephone application, a pedometer application and/or a music playing application, wherein each virtual battery may possess a predefined power budget from the battery. The aforementioned applications may be not executed concurrently, but each application may have its own virtual battery. The processing unit 110 monitors the power usage of each application, and updates the remaining power level of each virtual battery. For example, as shown in FIG. 5C, when the telephone application is executed, the associated user interface 502 is currently displayed on the display unit 170. The user interface 502 of the telephone application renders a virtual battery icon 512 indicating the remaining power level of the virtual battery for the telephone application. Similarly, as shown in FIG. 5D, when a pedometer application is executed, the associated user interface 504 is currently displayed on the display unit 170. The user interface 504 of the pedometer application renders a virtual battery icon 514 indicating the remaining power level of the virtual battery for the pedometer application. Similarly, as shown in FIG. 5E, when a music playing application is executed, the associated user interface 506 is currently displayed on the display unit 170. The user interface 506 of the music playing application comprises a virtual battery icon 516 indicating the remaining power level of the virtual battery of the music playing application.

In view of the above, a plurality of virtual batteries from the battery is allocated for the applications respectively, wherein each virtual battery has an individual power budget from the battery by the electronic device 100. It should be noted that each application possesses an individual user interface, and when one of the applications is active, the user interface associated with the active application displays an individual battery icon indicating remaining power budget of the virtual battery associated with the active application on the display unit. It should be also noted that the virtual batteries are allocated based on the predefined applications, i.e. by software, and various hardware components may be utilized during execution of each predefined application in the aforementioned embodiment. The processing unit 110 may monitor the power usage of each predefined application being executed and update the status of the associated virtual battery.

Figure 6:
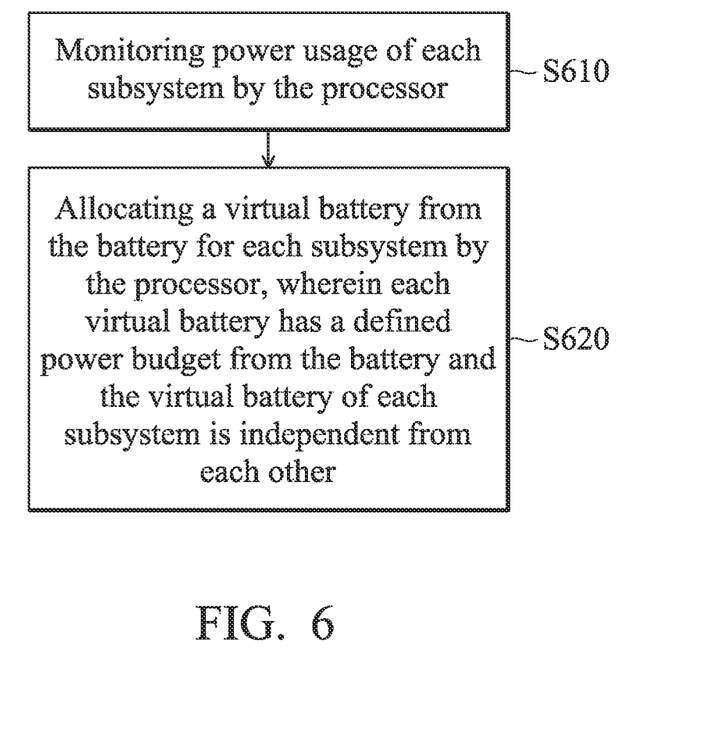
FIG. 6 is a flow chart of a method for allocating power on an electronic device in accordance with an embodiment of the invention.

FIG. 6 is a flow chart of a method for allocating power on an electronic device in accordance with an embodiment of the invention. In step S610, the power usage of each subsystem is monitored, e.g. by the processing unit 110 in FIG. 1. In step S620, a virtual battery is allocated from the battery, e.g. battery module 180, for each subsystem, e.g. by the processing unit 110 in FIG. 1. It should be noted that each virtual battery has a defined power budget from the battery and the virtual batteries of the subsystems are independent from each other. Preferably, one of the remaining virtual batteries can be utilized to charge at least one specific virtual battery when the at least one specific virtual battery of the virtual batteries is exhausted.

To sum up, an electronic device and a method for allocating power in the electronic device are provided. The electronic device and the method are capable of allocating virtual batteries for the subsystems in the electronic device. When one of the virtual batteries runs out, the associated subsystem will be turned off and other subsystems will not be affected. Furthermore, virtual batteries with sufficient power budgets can be used to charge other virtual batteries.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
a plurality of subsystems;
a battery powering the plurality of subsystems; and
a processing unit, configured to allocate a plurality of virtual batteries from the battery for the subsystems respectively, wherein each virtual battery has a defined power budget from the battery,
wherein the virtual battery of each subsystem has different priority,
wherein when the power level of each virtual battery is not full and the battery is charged, the virtual battery having the highest priority is charged first.

2. The electronic device as claimed in claim 1, wherein the virtual battery for each subsystem is independent from each other, and when the virtual battery of a specific subsystem of the plurality of subsystems runs out, the remaining subsystems of the plurality of subsystems are not affected.

3. The electronic device as claimed in claim 1, wherein the processing unit further executes virtual battery management software to monitor power usage of each subsystem, so that the processing unit estimates the remaining power level of the virtual battery of each subsystem.

4. The electronic device as claimed in claim 3, further comprising:
a power management unit, coupled to the battery and the plurality of subsystems, and configured to control power usage of the subsystems based on the remaining power level of the virtual battery of each subsystem from the virtual battery management software.

5. The electronic device as claimed in claim 1, wherein each virtual battery has a predefined power budget ratio from the battery.

6. The electronic device as claimed in claim 5, wherein when the power level of each virtual battery is not full and the battery is charged, each virtual battery is charged in proportion to the predefined power budget ratio.

7. The electronic device as claimed in claim 1, wherein when at least one specific virtual battery of the virtual batteries is exhausted, one of the remaining virtual batteries is capable of being applied to charge the at least one specific virtual battery.

8. The electronic device as claimed in claim 7, further comprising:

a user interface having a plurality of virtual battery icons associated with the plurality of subsystems respectively, wherein when a power bar of a specific virtual battery icon of the plurality of virtual battery icons is adjusted, the power levels of other virtual batteries are changed based on the predetermined power budget ratios.

9. A method for allocating power on an electronic device, wherein the electronic device comprises a processing unit, a plurality of subsystems and a battery, the method comprising:

monitoring power usage of each subsystem;

allocating a virtual battery from the battery for each subsystem, wherein each virtual battery has a defined power budget from the battery and the virtual battery of each subsystem has different priority; and charging the virtual battery having the highest priority first when the power level of each virtual battery is not full and the battery is charged.

10. The method as claimed in claim 9, wherein the virtual battery of each subsystem is independent from each other, and when the virtual battery of a specific subsystem of the plurality of subsystems runs out, the remaining subsystems of the plurality of subsystems are not affected.

11. The method as claimed in claim 9, further comprising:
executing virtual battery management software to monitor power usage of each subsystem by the processing unit; and
estimating the remaining power level of the virtual battery of each subsystem by the processing unit.

12. The method as claimed in claim 11, further comprising:
controlling power usage of the subsystems based on the remaining power level of the virtual battery of each subsystem from the virtual battery management software.

13. The method as claimed in claim 9, wherein each virtual battery has a predefined power budget ratio from the battery.

14. The method as claimed in claim 13, further comprising:
charging each virtual battery in proportion to the predefined power budget ratio when the power level of each virtual battery is not full and the battery is charged.

15. The method as claimed in claim 9, further comprising:
applying one of the remaining virtual batteries to charge at least one specific virtual battery when the at least one specific virtual battery of the virtual batteries is exhausted.

* * * * *